United States Patent
Yilmaz et al.

(10) Patent No.: US 11,156,995 B2
(45) Date of Patent: Oct. 26, 2021

(54) SYSTEMS AND METHODS FOR REAL-TIME DATA PROCESSING AND FOR EMERGENCY PLANNING

(71) Applicant: Ohio State Innovation Foundation, Columbus, OH (US)

(72) Inventors: Alper Yilmaz, Lewis Center, OH (US); Nima Ajam Gard, Dublin, OH (US); Ji Hyun Lee, Columbus, OH (US); Tunc Aldemir, Columbus, OH (US); Richard Denning, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 17/264,122

(22) PCT Filed: Aug. 22, 2019

(86) PCT No.: PCT/US2019/047745
§ 371 (c)(1),
(2) Date: Jan. 28, 2021

(87) PCT Pub. No.: WO2020/041614
PCT Pub. Date: Feb. 27, 2020

(65) Prior Publication Data
US 2021/0149383 A1    May 20, 2021

Related U.S. Application Data

(60) Provisional application No. 62/721,273, filed on Aug. 22, 2018.

(51) Int. Cl.
*G05B 13/02* (2006.01)
*G05B 23/02* (2006.01)
(Continued)

(52) U.S. Cl.
CPC ......... *G05B 23/024* (2013.01); *G05B 13/027* (2013.01); *G06N 3/0454* (2013.01);
(Continued)

(58) Field of Classification Search
CPC .............. G05B 23/024; G05B 13/027; G05B 2219/32335; G06N 3/0454; G21D 3/001; G21D 3/04
See application file for complete search history.

(56) References Cited

U.S. PATENT DOCUMENTS

| | | |
|---|---|---|
| 2002/0084900 A1 | 7/2002 | Peterson et al. |
| 2008/0161989 A1 | 7/2008 | Breed |
| 2013/0132163 A1 | 5/2013 | Eder |

FOREIGN PATENT DOCUMENTS

WO    2017/223560 A1    12/2017

OTHER PUBLICATIONS

International Search Report and Written Opinion in International Application No. PCT/US2019/047745, dated Dec. 23, 2019 (13 pages).

(Continued)

*Primary Examiner* — Gary Collins
(74) *Attorney, Agent, or Firm* — Benesch, Friedlander, Coplan & Aronoff LLP

(57) ABSTRACT

Systems and methods are described herein for real-time data processing and for emergency planning. Scenario test data may be collected in real-time based on monitoring local or regional data to ascertain any anomaly phenomenon that may indicate an imminent danger or of concern. A computer-implemented method may include filtering a plurality of different test scenarios to identify a sub-set of test scenarios from the plurality of different test scenarios that may have similar behavior characteristics. A sub-set of test scenarios is provided to a trained neural network to identify one or more (Continued)

sub-set of test scenarios. The one or more identified sub-set of test scenarios may correspond to one or more anomaly test scenarios from the sub-set of test scenarios that is most likely to lead to an undesirable outcome. The neural network may be one of: a conventional neural network and a modular neural network.

22 Claims, 11 Drawing Sheets

(51) Int. Cl.
  *G06N 3/04* (2006.01)
  *G21D 3/00* (2006.01)
  *G21D 3/04* (2006.01)
(52) U.S. Cl.
  CPC .............. *G21D 3/001* (2013.01); *G21D 3/04* (2013.01); *G05B 2219/32335* (2013.01)

(56) References Cited

OTHER PUBLICATIONS

Mandelli, D. et al., "Probabilistic Clustering for Scenario Analysis," Jun. 1, 2010, retrieved from https://www.diegomandelli.com/papers/2010/ANS2010lasvegas/MandelliWi2010Submitted.pdf (4 pages).
Santhosh, B. et al., "Diagnostic & Prognostic System for Identification of Accident Scenarios and Prediction of Source Term' in Nuclear Power Plants under Accident Conditions," May 1, 2014, retrieved from https://pdfs.semanticscholar.org/5c88/3ee48c764d38e3e3a3d66bd9c0d3f8db6d6a.pdf (16 pages).

Table 1 Critical parameters and instrumentation used for OST ← 200

| Parameter | Primary Purpose/ Information Provided | Measurement Method | Alternate Method |
|---|---|---|---|
| Steam Generator (SG) Water Level | • RCS Heat Sink Available<br>• Creep Rupture of SG Tubes Possible<br>• Fission Product Scrubbing for Faulty or Leaking SG Tubes | • Wide Range SG Level* | • Narrow Range SG Level |
| SG Pressure | • Creep Rupture of the SG Tubes Possible<br>• Ability to Inject into the SGs | • SG Secondary Pressure* | • TDAFW Pump Header Pressure (Only for Select SGs) |
| RCS Pressure | • Ability to Inject into the RCS<br>• High Pressure Melt Ejection Possible<br>• Uncontrolled Opening in the RCS | • Wide Range RCS Pressure | • Pressurizer Pressure<br>• Accumulator Pressure<br>• Charging Pump of LHSI Pump Dis-Charge Pressure |
| Core Temperature | • Transition from EOPs to SAMG<br>• In-Vessel Recovery of Core Cooling | • Core Exit Thermocouples (CETCs)* | |
| RCS Temperature | • Understanding Earlier Stages of Accident Progression | • CETCs* [Same as the Variables above] | • Resistance Temperature Detector (RTDs) [Hot Leg or Cold Leg] |
| RCS Water Level | • Understanding Earlier Stages of Accident Progression | • Reactor Vessel Level Indication System (RVLIS) | • Ex-Core Neutron Detectors |
| Containment Water Level | • Flooding of Equipment and Instruments<br>• Safety Injection of Spray Recirculation Possible<br>• Spillover to the Reactor Cavity<br>• Ability to Quench Dispersed Core Debris | • Wide Range Containment Water Level | • RWST Level<br>• Narrow Range Sump Level |
| Containment Flammable Gas Concentration | • Containment Gas Flammability | • Containment Hydrogen Monitor | • Sampling<br>• Calculational aids |
| Containment Pressure | • Containmment Over-pressurization | • Wide Range Containment Pressure | • Containment Temperature |

* Three monitored variables

FIG. 2

Table 2 Data distribution of the training, testing, and validation sets for exposures within 2 miles

| Train | | Test | | Validate | Total |
|---|---|---|---|---|---|
| Bin over 10rem | Bin 0-10rem | Bin over 10rem | Bin 0-10rem | Only Bin over 10rem | |
| 96 | 90 | 26 | 26 | 2418 | 2656 |

Table 3 Data distribution of the training, testing, and validation sets for exposures within 10 miles

| Train | | Test | | Validate | Total |
|---|---|---|---|---|---|
| Bin over 10rem | Bin 0-10rem | Bin over 10rem | Bin 0-10rem | Only Bin over 10rem | |
| 450 | 421 | 69 | 69 | 1647 | 2656 |

|  | FN | | FP | | TN | | TP | |
| --- | --- | --- | --- | --- | --- | --- | --- | --- |
|  | 2 mile | 10 mile | 2 mile | 10 mile | 2 mile | 10 mile | 2 mile | 10 mile |
| Testing | 0 | 10 | 1 | 10 | 25 | 59 | 26 | 59 |
| Validation | 1 | 142 | 0 | 0 | 0 | 0 | 2417 | 1505 |
| Testing + Validation | 1 | 152 | 1 | 10 | 25 | 59 | 2443 | 1564 |

FIG 6

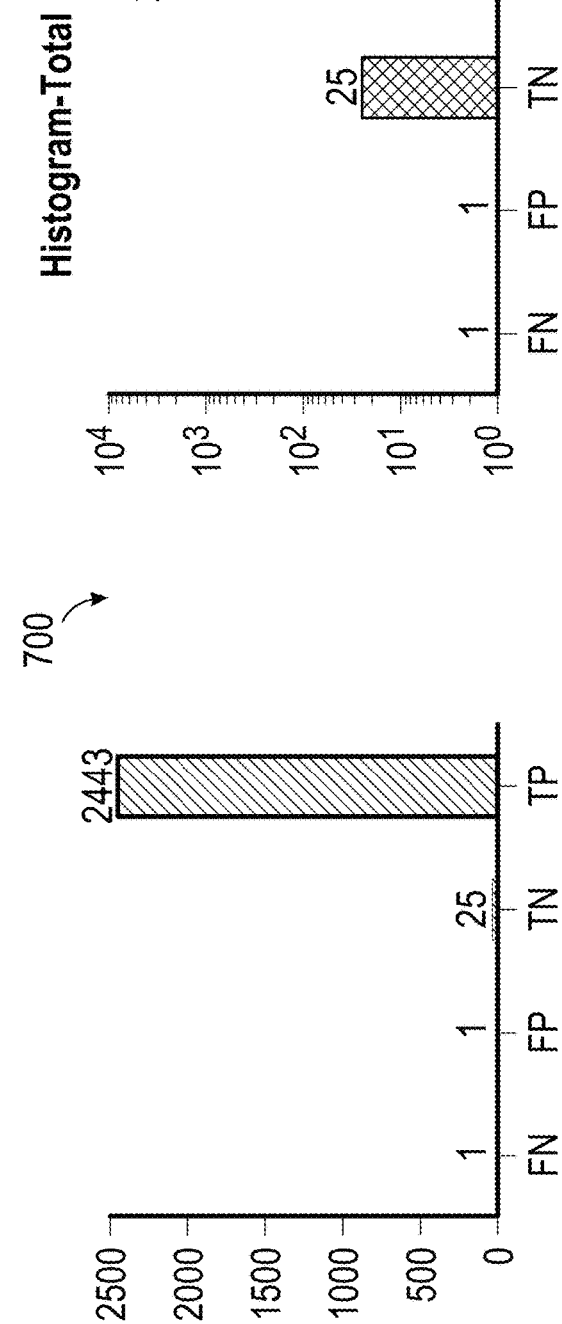
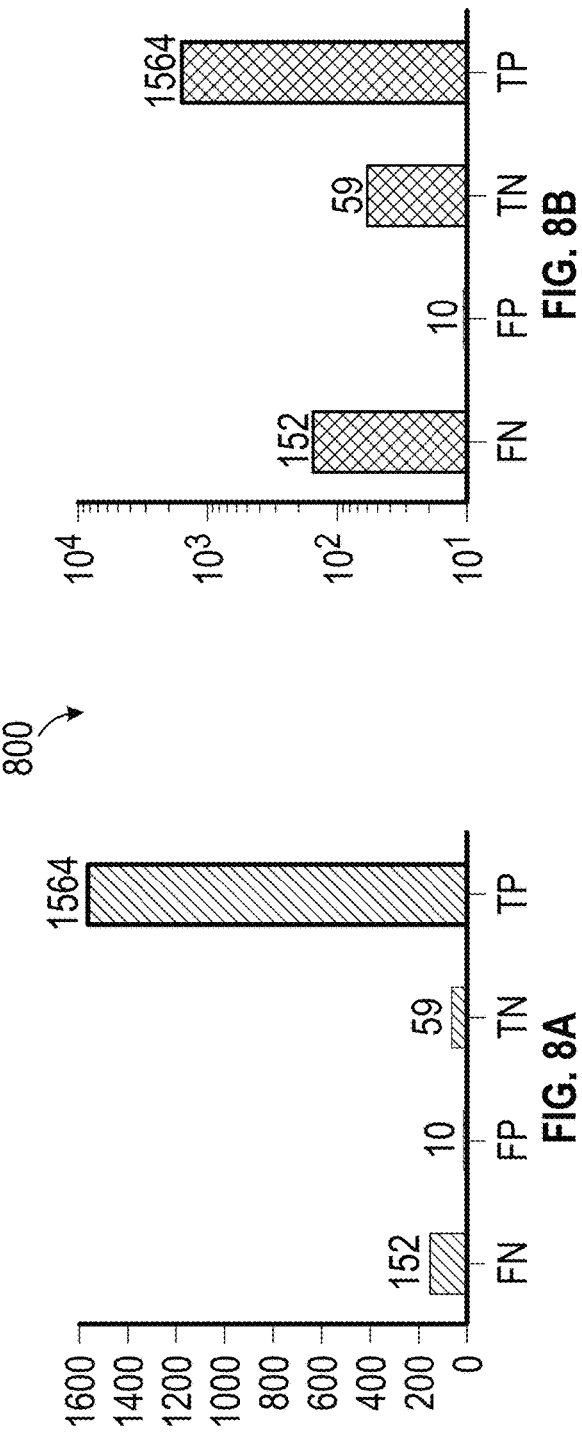

FIG 12A
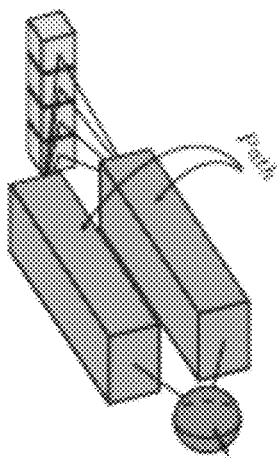
(a) Multi-path
FIG 12B
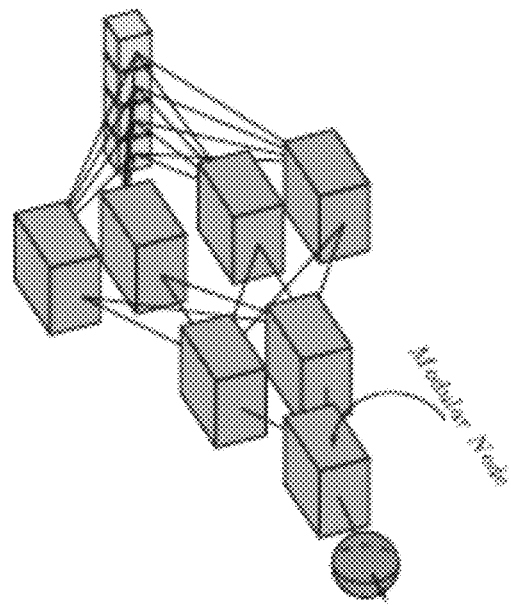
(b) Modular node
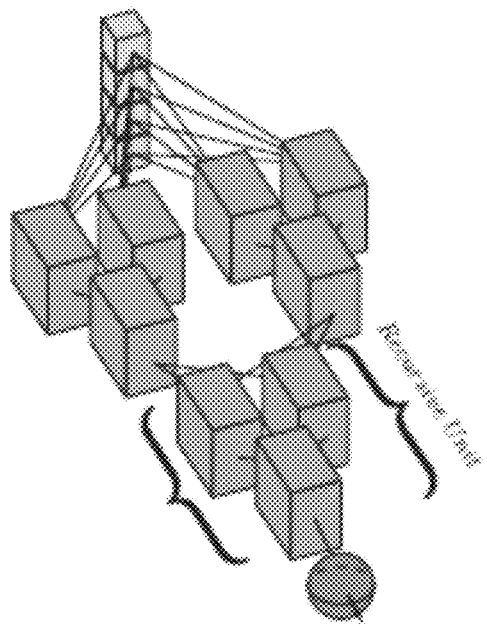
(c) Recursive
FIG 12C
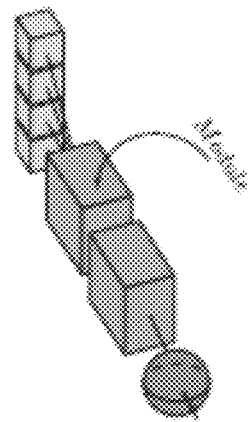
(d) Sequential
FIG 12D

SYSTEMS AND METHODS FOR REAL-TIME DATA PROCESSING AND FOR EMERGENCY PLANNING

RELATED APPLICATION

This disclosure is a national stage of International Patent Application PCT/US2019/047745, filed on Aug. 22, 2019, which claims priority to and benefit from U.S. Provisional Patent Application Ser. No. 62/721,273 titled "Systems and Methods for Data Processing for Real-Time Emergency Planning," filed on Aug. 22, 2018, which are herein incorporated by reference in their entirety.

GOVERNMENT SPONSORSHIP

This invention was made with government support under Sponsor Award No. DE-NE0008710 awarded by the U.S. Department of Energy. The government has certain rights in the invention.

TECHNICAL FIELD

This disclosure generally relates to systems and methods for real-time data processing and for emergency planning.

BACKGROUND

An emergency is an unplanned situation or event (e.g., an accident) that when occurs increases a risk of injury to the well-being of people, animals, and/or property. Emergencies necessitate prompt action to mitigate a hazard or adverse consequence for human health, safety, quality of life, property or the environment.

SUMMARY

A computer-implemented method and a neural network may include receiving scenario test data that may be representative of a plurality of different test scenarios for a system. The scenario test data may be collected in real-time based on monitoring local or regional data to ascertain any anomaly phenomenon from scenarios which may be applicable to any one of: nuclear power plant, hydro-electric dam, coal-fired generator plant, power grid instability, water pumping station, food contamination sampling, biohazards, disease outbreak, communication network traffic, network denial attacks, oil refinery, off-shore drill platform, chemical plant, weather patterns, tides level, people movement, facial recognition, to name a few. Any anomaly from the scenario data analysis may be an indication of an imminent danger that may lead to catastrophe, a criminal act or a behavioral change that may result in a disruption to the population or a surrounding community.

In an embodiment, each test scenario may be characterized by a set of observable parameters of the system. A computer-implemented method may include filtering a plurality of different test scenarios to identify a sub-set of test scenarios from the plurality of different test scenarios that may have similar behavior characteristics. The computer-implemented method may include providing a sub-set of test scenarios to a trained neural network to identify one or more sub-set of test scenarios. The one or more identified sub-set of test scenarios may correspond to one or more anomaly test scenarios from the sub-set of test scenarios that is most likely to lead to an undesirable outcome associated with an emergency causing event.

In another example, a system as shown and/or described herein.

In an even further example, a product as shown and/or described herein.

In another example, a method as shown and/or described herein.

In an example, a device as shown and/or described herein.

In another example, an apparatus as shown and/or described herein.

The summary is provided merely for purposes of summarizing some example embodiments so as to provide a basic understanding of some aspects of the disclosure. Accordingly, it will be appreciated that the above described examples should not be construed to narrow the scope or spirit of the disclosure in any way. Other examples, embodiments, aspects, and advantages will become apparent from the following detailed description taken in conjunction with the accompanying drawings.

BRIEF DESCRIPTION OF THE DRAWINGS

FIG. 2 illustrates an exemplary table that includes a plurality of observable parameters of a system in an embodiment.

FIG. 6 illustrates an exemplary contingency table for testing, validation, and testing+validation sets.

FIGS. 7A and 7B illustrate an exemplary contingency table for testing, validation, and testing+validation set.

FIGS. 8A and 8B illustrate an exemplary contingency table for testing, validation, and testing+validation set.

FIGS. 12A-D illustrate different implementations of Repeated Blocks modular topology for real-time data processing to detect anomaly scenarios, as shown in FIG. 10.

DETAILED DESCRIPTION

Figure 1:
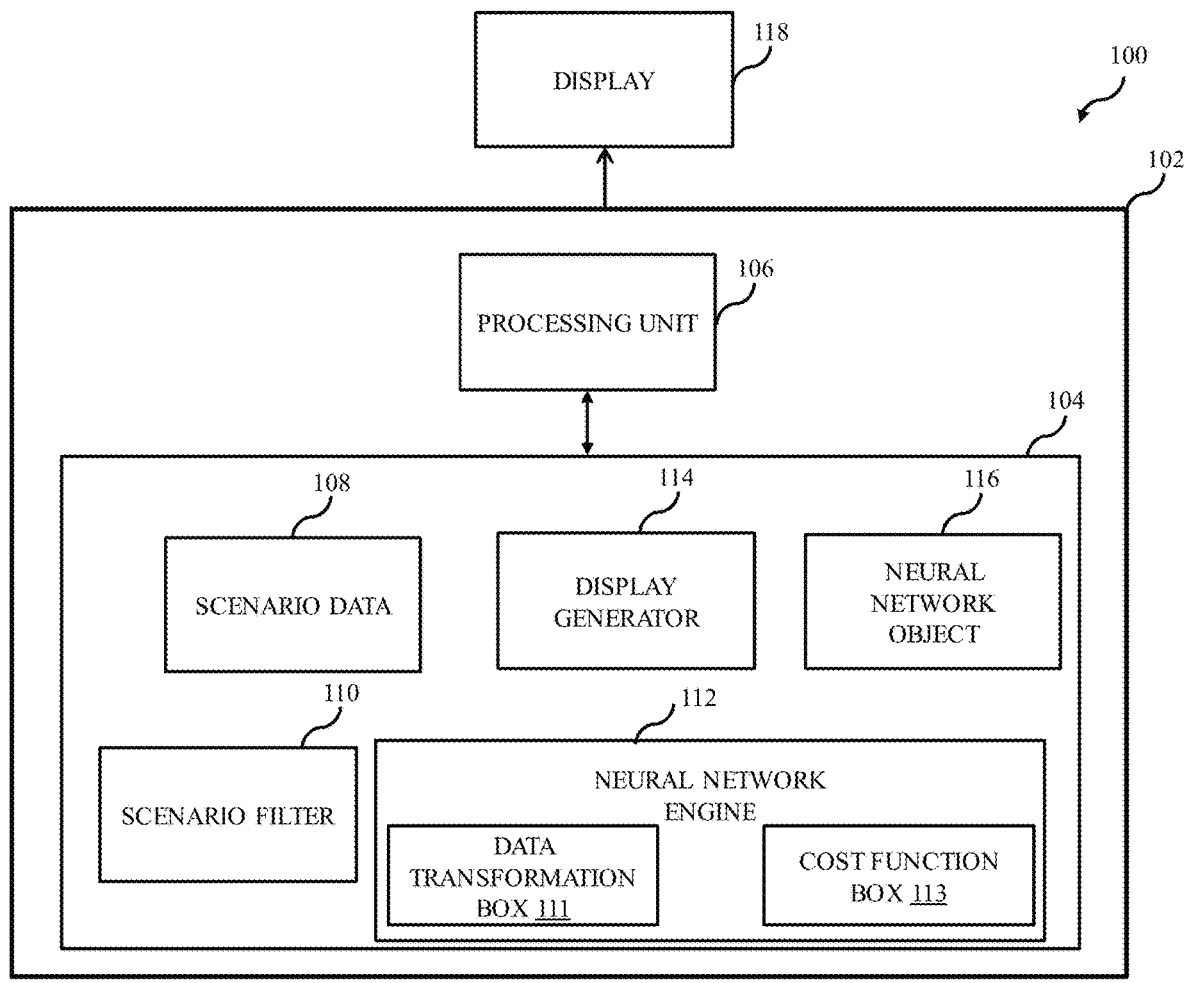
FIG. 1 illustrates an exemplary environment that includes a tool (hardware platform) for real-time data processing to detect anomaly scenarios for emergency planning.

Emergencies are undesirable and in many instances may be prevented had circumstances leading up to an accident been recognized, and acted upon, prior to the accident's occurrence. The actions taken in the initial moments of an emergency are critical. For example, a prompt warning to humans to evacuate, shelter or lockdown may save lives. Action by employees with knowledge of building and process systems may help mitigate a leak and minimize damage to the facility and the environment. Response strategies (or plans) may be developed to tackle the emergency and provide guidelines for humans on how to respond to the occurrence of an emergency.

For example, accidents resulting at a nuclear facility (e.g., anyone of nuclear power plants, nuclear waste repositories, etc.) may have profound effects on the environment, including the well-being of people, animals, and/or property. In an example wherein an accident occurs at a nuclear facility, personnel would be responsible for returning the nuclear facility to a normal operating state (e.g., safe state). The plant staff should be supported in taking these actions with Emergency Operating Procedures (EOPs) for which they receive extensive training and take corrective actions to mitigate or to prevent occurrence of a nuclear facility melt down accident.

EOPs are for maintaining fundamental safety functions and preventing a hazard or adverse consequence for human health, safety, quality of life, property or the environment. The scope of EOPs is to provide procedural guidance for stake-holders to handle emergency conditions. Thus, EOPs generally provide actions for a wide spectrum of operating conditions, ranging from abnormal operation up to accidents far exceeding the design basis of the setting the data is collected, such as sensory data in a nuclear power plant.

Severe accident conditions may include accident conditions involving significant damage to the environment. For example in nuclear power plants, severe accident conditions begin when significant fuel damage occurs or is anticipated. From the perspective of EOPs, severe accident conditions occur when the provisions and guidance of EOPs are no longer effective in preventing the hazard. EOPs concentrate on protecting integrity of the setting the data is acquired. It is only after this fails or is imminent that personnel rely on severe accident guidelines (SAG), which focus on maintaining other barriers for public protection, typically the containment or confinement of effects and/or results of an emergency causing event.

Guidelines referred to as severe accident management guidelines (SAMG) have been developed for each level. SAMG may include directions on how to terminate core damage once it has started, to maintain the capability of the containment as long as possible, to minimize on-site and off-site releases, to return the plant to a safe operating state, etc. If there is a potential for a significant release of radioactive material into the environment as may be inferred from PRA, the personnel must declare a level of site emergency. However, offsite response, such as evacuation, is ordered not by the personnel but by State personnel (e.g., the Governor). In making offsite response decisions, States must rely on the expertise of the personnel, their understanding of the current state of the nuclear facility, and their projection (or predictions) as to the likely outcomes of the event (e.g., results and/or effects of the event).

An event tree (ET)/fault tree (FT) methodology may be traditionally used for PRA to account for uncertainties in accident progression. The ET may be used to model the sequence of events to possible end states. When there is uncertainty in the occurrence of an event, the ET branches into two (or more) ETs where each ET follows the consequences associated with the uncertain event. For example, if a valve is designed to open when the pressure in the reactor vessel exceeds a pre-specified set point, the ET may need to follow the consequences of the valve opening or failing to open. The uncertainties associated with the events occurring or not occurring are estimated using FTs.

The traditional ET/FT approach has challenges in modeling the interaction among hardware/process/software/human behavior and may have subsequently challenges in adequately supporting the declaration of a site emergency, as well as assisting in emergency response. In particular, scenarios that may lead to catastrophic events may not be identified and personnel may not be able to properly and efficiently respond to the emergency causing event. Effective real-time SAMGs to be constructed necessitates accurate identification of scenarios are most likely to lead to undesirable radiological impact.

Systems, methods, devices, apparatuses, and products (referred to herein more generally as "systems") are described herein for data processing for real-time emergency planning. The systems described herein can process data and assist personnel in assessing an event sequence probabilistically as an Unusual Event (UE), an Alert, a Site Area Emergency (SAE) or a General Emergency (GE) as the accident evolves and may reduce the level of exposure of the population, as well as the negative impacts of possible evacuation. Using the systems described herein, State personnel may be better equipped with technical guidance in undertaking emergency response activities associated with an evacuation. In an example, the systems described herein may project levels of radiological exposure in a surrounding environment, including humans, and their likelihoods based on observable parameters from personnel and environmental devices (e.g., instrumentation) at a nuclear facility.

In some examples, the systems described herein may be configured to construct a real-time SAMGs based on dynamic event trees (DETs) to support a declaration of a site emergency and to guide off-site response. In DET analysis, the systems described herein may be configured to characterize alternative scenarios or pathways by branching points in a tree as the accident progresses in time for which branching probabilities may be assigned in a similar manner to ETs. However, unlike the traditional ET/FT approach, the temporal behavior of all stages of a severe accident may be reflected by DETs, including the interaction among hardware/process/software/human behavior. In that respect, with data from observed variables that may be monitored by facility personnel, DETs may be used to estimate a likelihood of different levels of offsite release of radionuclides based on deep learning methodologies described herein based on the training data set.

Accordingly, the systems described herein may assist personnel in predicting the likelihood of future states of the nuclear facility to support the declaration of a site emergency and to assist in the emergency response. The systems described herein may be configured to project the radiological outcomes to the public based on a deep learning network. Input data to the system described herein includes temporal behavior of monitored data in a control room, along with the training of the tool based on output of MELCOR/RASCAL codes (as an example) obtained from the simulation of a large set of possible accident scenarios representing potential outcomes of a given initiating event. Accordingly, the systems described herein have particular advantages over existing techniques, which will become more readily apparent according to the examples described herein.

FIG. 1 illustrates an exemplary environment that includes a tool 102 for data processing for real-time emergency planning. The tool 102 may be implemented on a tangible hardware, such as a computer, such as a laptop computer, a desktop computer, a server, a tablet computer, a workstation, or the like. In some examples, the tool 102 may be implemented on a mobile device, for example, a cellular device. The tool 102 may include memory 104 for storing data and machine-readable instructions. The memory 104 may be implemented, for example, as a non-transitory computer storage medium, such as volatile memory (e.g., random access memory), non-volatile memory (e.g., a hard disk drive, a solid-state drive, flash memory or the like) or a combination thereof. In an alternate embodiment, the tool 102 may be implemented on a distributed cloud network, such as Amazon Web Services (AWS), Microsoft's Azure, Google Cloud or a similar cloud network service.

The tool 102 may include a processing unit 106 (e.g., a Central Processing Unit (CPU), a Graphical Processing Unit (GPU) or similar) that may be configured to access the memory 104 and execute the machine-readable instructions stored in the memory 104. The processing unit 106 may be implemented, for example, as one or more processor cores. In the present example, although the components of the tool 102 are illustrated as being implemented on the same system, in other examples, the different components could be distributed across different systems and communicate, for example, over a network. The processing unit 106 may be configured to receive scenario data 108. The scenario data 108 may be generated based on a DET (dynamic event trees) evaluation associated with an emergency causing event. The scenario test data 108 may be representative of a plurality of different test scenarios for a system at a nuclear facility. For example, the scenario data 108 may be generated based on a DET study performed for a station blackout (SBO) in a three-loop pressurized water reactor (PWR).

In an embodiment, part or all of the DET scenario data 108 may be also generated by the Analysis of Dynamic Accident Progression Trees (ADAPT) system (not shown in FIG. 1). The ADAPT system may be programmed to determine an evolution of possible scenarios for a system model (e.g., the three-loop PWR) based on branching and stopping rules, which may be user-defined. The ADAPT system may be programmed to keep track of scenario likelihoods and may graphically display the DETs and simulator outputs as a function of time. The ADAPT system may be programmed to interface with severe accident analysis code for simulation of the emergency event (not shown in FIG. 1). In some examples, the severe accident analysis code may be part of the ADAPT system (e.g., as a module).

A severe accident analysis code may include a simulation data generator. As an example, MELCOR may be used to model a behavior of a system associated with an emergency causing initiating event. MELCOR is a fully integrated, software code that may be to simulate the progression of accidents in light water reactor nuclear power plants. MELCOR may provide a best-estimate code for severe accident analysis. A wide range of accident phenomena may be modeled in MELCOR including, but not limited to, thermo-hydraulic response in a reactor coolant system, reactor cavity, containment and confinement buildings, core heat-up, degradation, and relocation, ex-vessel debris behavior, core-concrete attack, hydrogen production, transport, and combustion; fission product release and transport, impact of engineered safety features on thermal-hydraulic and radionuclide behavior.

For example, the ADAPT system may be programmed to provide input data (e.g., branching rules, stop conditions, etc.) to the severe accident analysis code for DET analysis of the system model for an emergency causing initiating event. The input data may be provided at a user input device (not shown in FIG. 1). The severe accident analysis code may be programmed to simulate the system model based on the input data from the ADAPT system, as well as to advance the emergency event through predetermined time steps until a pre-specified end time may be achieved. The data from simulation results data may correspond to the scenario data 108.

The scenario data 108 may include a plurality of scenario datasets that may represent a plurality of different scenarios for the system (and/or the plant facility). Each scenario dataset may include branching combination results, which may be associated with the emergency causing event. For each scenario dataset, the severe accident analysis code (or the ADAPT system) may be programmed to calculate probabilities of radionuclide release fractions. Each scenario may be characterized by a set of observable parameters of the system in response to the emergency causing event. In some examples, each scenario may be characterized by a combination of the observable parameters, as disclosed in Table 1 of FIG. 2. FIG. 2 illustrates an exemplary table that includes a set of observable parameters of the system at a nuclear facility.

For training the neural network engine 112 in FIG. 1, the observable parameters for each scenario may be obtained from the severe accident analysis code for a given number of time divisions over multiple simulations of the system. Each scenario may be represented by a matrix, n×m, wherein n is a number of the observable parameters and m is the given number of time divisions. In some examples, the tool 102 may include a consequence system, such as a radiological assessment system for consequence analysis (RASCAL) or a MELCOR Accident Consequence Code System (MACCS) (not shown in FIG. 1). The consequence system may be programmed to determine associated offsite dosage for each scenario. The consequence system may be programmed to characterize environment impacts for each scenario based on key radionuclides (e.g., Cs-137 and I-131), or other radionuclides. In some examples, a single pre-defined meteorology may be used in the assessment of environmental impact. The consequence system may be used to assess the radiation dosage at user-defined time that may be experienced by an individual located within a given amount of miles of the nuclear facility (e.g., within two miles and ten miles of the nuclear facility) for each scenario.

The tool 102 may further include a scenario filter 110. The scenario filter 110 may be programmed to filter the plurality of different scenarios to identify a sub-set of scenarios having similar behavior characteristics. The scenario filter 110 may be programmed to define the first bin (e.g., first range) and a second bin (e.g., second range). For example, the first bin may correspond to a total effective dose equivalent (TEDE) that is greater than 10 rem (referred to herein as "Bin over 10 rem"). The second bin may correspond to a TEDE less than or equal to 10 rem (referred to herein as "Bin 0-10 rem"). The scenario filter 110 may be programmed to assign the identified sub-set of scenarios to one of the first and the second bin.

In some examples, the scenario filter 110 may be programmed to apply a clustering process to different scenarios to determine to which bin each scenario may be assigned. The clustering process may be used to identify scenarios (e.g., scenario datasets—observable parameters for the system) with similar behavior or when classifying their characteristics. In an example, the scenario filter 110 may be programmed to apply the mean shift methodology (MSM) to assign each point in the state space (e.g., scenario at each instance of time) to a cluster centroid based on a bandwidth of a defined kernel through a set of local averaging calculations. The idea is to consider all the points that are inside the centroid and determine the center of mass $m(s_A)$ of these points as shown in Eq. (1):

$$m(S_A) = \frac{\sum_{i=1}^{l} \vec{x_i} g\left(\left\|\frac{S_A - \vec{x_i}}{h}\right\|^2\right)}{\sum_{i=1}^{l} g\left(\left\|\frac{S_A - \vec{x_i}}{h}\right\|^2\right)} \quad (1)$$

In Eq. (1), $x_i$ may correspond to a data point (scenario) of location in the space of possible scenarios and $I$ may represent a total number of scenarios. The $S_A$ in Eq. (1) may correspond to an initial estimation of location (original point). A Gaussian kernel $gg(x^{\rightarrow})$ may be used for weighing the distance between $S_A$ and $x_i$ and may be defined by:

$$g(\vec{x}) = e^{-\|\vec{x}\|^2/h^2} \quad (2)$$

Figures 3, 4:
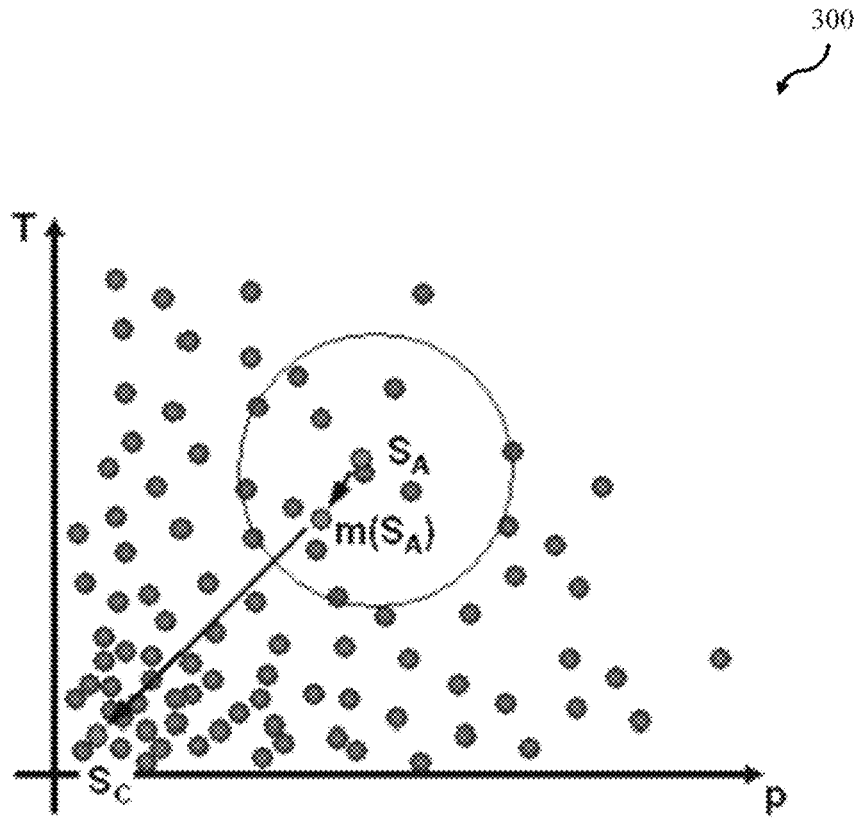
FIG. 3 illustrates a filtering operation by clustering of exemplary two-dimensional data into a number of bins with a radius or bandwidth according to the embodiment of FIG. 2.
FIG. 4 illustrates exemplary tables characterizing a distribution of a plurality of scenarios based on a clustering process according to the embodiment of FIG. 2.

FIG. 3 illustrates clustering of exemplary two-dimensional data into a number of bins with radius or bandwidth h.

The process may be repeated until the centroids of clusters converge within a given error. From each cluster, the centroid and specific scenarios within that cluster may be identified and assigned to a respective bin. For example, Bins over 10 rem and 0-10 rem may use the same bandwidth. The scenario filter 110 may be programmed to partition the plurality of different scenarios into three sets: a training set (consistent of Bins over 10 rem and 0-10 rem), a testing set (consisting of Bins over 10 rem and 0-10 rem), and a validation set (Bin over 10 rem) according to the clustering process. For the set of exposures in the proximity of the nuclear facility (e.g., within two miles) the Bin over 10 rem of the training set was constructed by random sampling 3% of each cluster, and Bin 0-10 rem by random sampling 90% of each cluster for balancing the number of scenarios in each bin. The remaining scenarios in Bin over 10 rem constituted the validation set. In a similar manner for the region extending to a greater distance from the nuclear facility (e.g., 10 miles from the nuclear facility), Bin over 10 rem of the training set was constructed by 21% of each cluster and Bin 0-10 rem by 90% of each cluster.

FIG. 4 illustrates exemplary tables characterizing a distribution of the plurality of scenarios in the proximity of the nuclear facility based on the clustering process. In Table 2, the training set has 186 scenarios, the testing set has 52 scenarios, and the validation set has 2418 scenarios. Table 3 illustrates the distribution of the plurality of scenarios for the set of exposures extending to a greater distance from the nuclear facility, wherein the training set has 871 scenarios, the testing set has 138 scenarios, and the validation set has 1647 scenarios.

Figure 5:
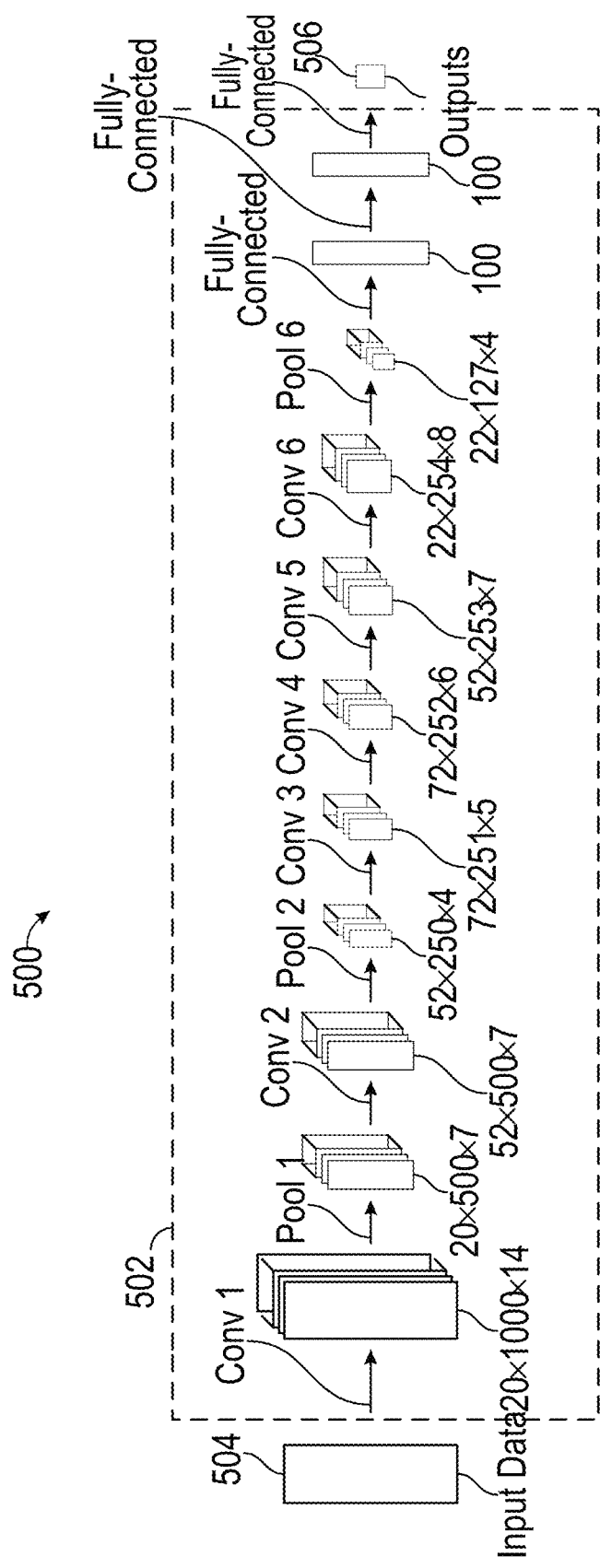
FIG. 5 illustrates an exemplary convolutional neural network for real-time data processing to detect anomaly scenarios.
Figure 10:
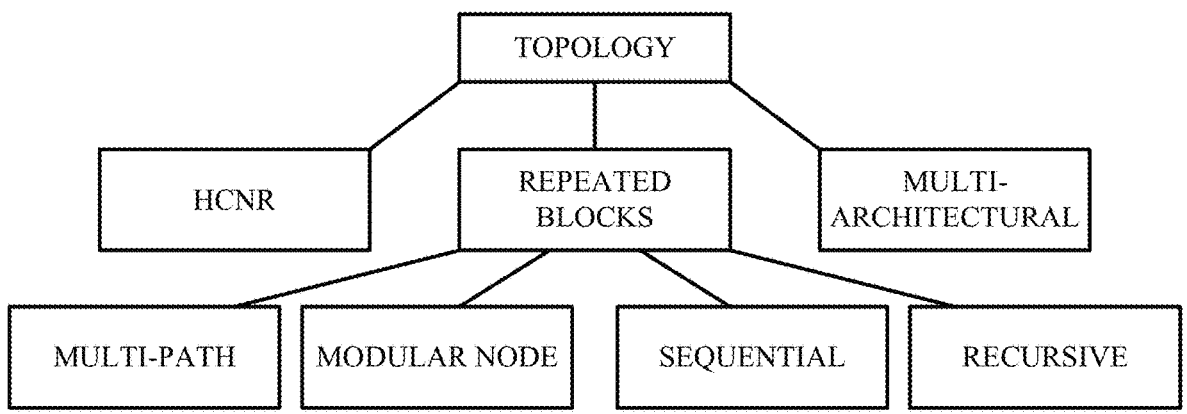
FIG. 10 illustrates an overview of different techniques in topology modularization utilized in neural network data processing.
Figure 11B:
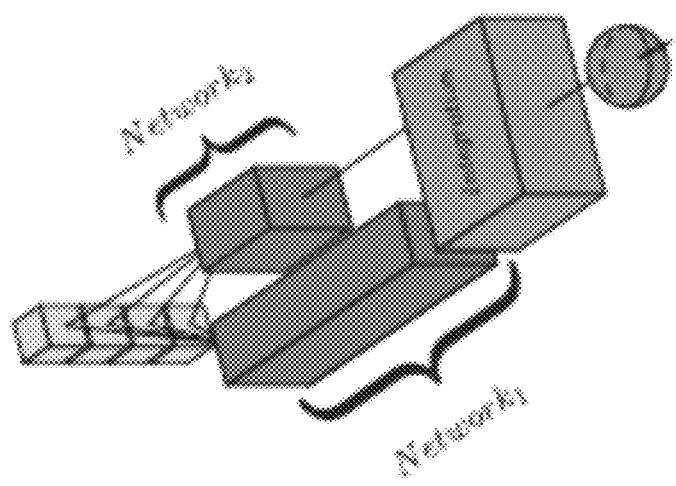
FIG. 11B illustrates a Multi-architecture modular topology for real-time data processing to detect anomaly scenarios, as shown in FIG. 10.
Figure 11A:
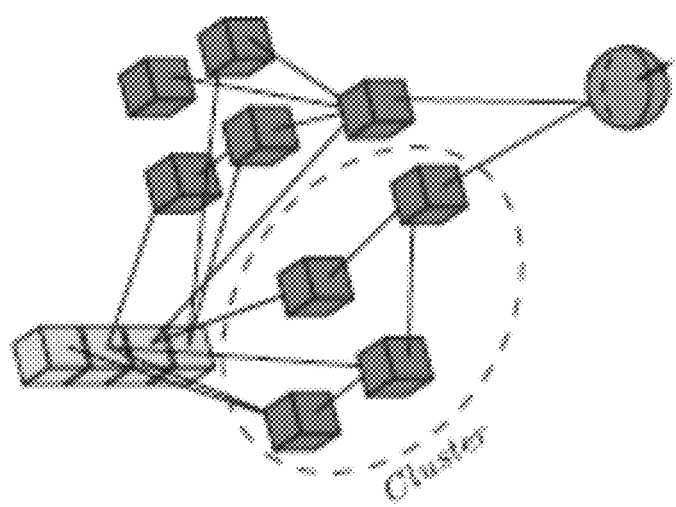
FIG. 11A illustrates a Highly-clustered non-regular (HCNR) modular topology for real-time data processing to detect anomaly scenarios, as shown in FIG. 10.

The tool 102 may further include a neural network engine 112. The neural network engine 112 may be programmed to generate a neural network object 116 that may include an input layer and an output layer between which one or more hidden layers may be generated. In some examples, the neural network object 116 may communicate to one of: a convolutional neural network (CNN) and a generalized custom neural network. FIG. 5 illustrates an exemplary convolutional neural network (CNN) 502 and FIG. 10 illustrates an exemplary generalized custom neural network. In some examples, the CNN 502 may be realized by a hardware and software tool, such as the tool 102, as illustrated in FIG. 1. Additionally, or alternatively, the CNN 502 may correspond to the neural network object 116, as illustrated in FIG. 1. The CNN 502 may be generated by the neural network engine 112 based on user input (e.g., a number of convolution layers, pooling layers, output layers, fully connected layers, etc.). The CNN 502 may include a plurality of convolution layers, a plurality of fully connected layers, a plurality of max-pooling layers, an output layer and an input layer. In some examples, the CNN 502 may include six convolutional layers and three fully-connected layers stacked aside that may include two different classes, as shown in FIG. 5.

In an example, the CNN 502 may be programmed to receive input data 504 (e.g., scenarios test data from a nuclear power plant) and process the input data to produce a plurality of output labels 506. In some examples, the plurality of output labels 506 may include the Bin 0-10 rem and the Bin over 10 rem. In this example, the last fully-connected layer of the CNN 502 may be programmed to produce resultants of 2 output labels 506, which may be the Bin 0-10 rem and the Bin over 10 rem.

A first convolutional layer of the CNN 502 may be programmed to process the input data with 20 kernels of size 1×1 with a stride 1. The output of the first layer may be used as an input of the second layer and a second convolutional layer of the CNN 502 may be programmed with 52 kernels of size 5×5 with a pad 2. A third convolutional layer of the CNN 502 may be programmed to process the input data with 71 kernels of size 2×2 with a pad 1. A fourth convolutional layer of the CNN 502 may be programmed to process the input data with 72 kernels of size 2×2 with a pad 1, a fifth convolutional layer of the CNN 502 may be programmed to process the input data with 52 kernels of size 2×2 with a pad 1, and a sixth convolutional layer of the CNN 502 can be programmed to process the input data with 22 kernels of size 2×2 with a pad 1 are applied.

The neural network engine 112 may be programmed to train the CNN 502 based on scenario training data comprising a plurality of training scenarios. In some examples, the plurality of training scenarios may correspond to the scenario training set. The neural network engine 112 may be programmed to train parameters of the CNN 502 based on the scenario training data. After training the CNN 502, the neural network engine 112 may be programmed for testing different scenarios for the system in connection with the emergency causing event. In an example, the CNN 502 may be programmed to receive scenario test data representative of a plurality of different scenarios for the system. In some examples, the scenario test data may correspond to the scenario test set. The neural network engine 112 may be programmed to provide the scenario test data to the CNN 502 for classification of the plurality of different scenarios. The CNN 502 may be programmed to classify each of the plurality of different scenarios as having a TEDE less than or equal to 10 rem or having a TEDE greater than 10 rem. Each scenario of the plurality of different scenarios classified as having the TEDE greater than 10 rem may correspond to one or more scenarios that is most likely to lead to the undesirable outcome associated with the emergency causing event. In an example, the undesirable outcome may correspond to a release of ionizing radiation. In some examples, the tool 102 may be programmed to generate a real-time emergency plan for real-time emergency planning based on the one or more scenarios classified as having the TEDE greater than 10 rem.

In some examples, the neural network engine 112 may be programmed to communicate with a display generator 114 stored in the memory 104. The display generator 114 may be programmed to provide data to a display 118. The display generator 114 may be programmed to generate display data characterizing the one or more scenarios classified as having the TEDE greater than 10 rem. The display 118 may be configured to render the display data to provide visualization of the one or more of scenarios classified as having the TEDE greater than 10 rem. In some examples, the rendered display data may be used by a human for real-time emergency planning.

The resulting number of false negatives (FNs) (belonging to Bin over 10 rem but identified as belonging to Bin 0-10 rem), false positives (FPs) (belonging to Bin 0-10 rem but identified as belonging to Bin over 10 rem), true negatives (TNs) (belonging to Bin 0-10 rem and identified as belonging to Bin 0-10 rem), and true positives (TPs) (belonging to Bin over 10 rem and identified as belonging to Bin over 10 rem) for testing, validation, and testing plus validation cases are presented in Table 4, as shown in FIG. 6. FIGS. 7-8 show the testing+validation set of TPs, TNs, FPs, and FNs for the 2-mile and the 10-mile transport. In some examples, the numbers of FNs, FPs, and TNs may be substantially smaller than TPs. In the testing set of 2-mile transport, there was 1 false positive out of a total of 2418 scenarios and the rest of data were identified correctly. The validation set of 2-mile transport contains one misidentified scenario, a FN, which was incorrectly identified as Bin 0-10 rem instead of Bin over 10 rem. There were 10 false negatives and 10 false positives out of a total 138 testing scenarios in 10-mile transport. There were 142 false negatives in the validation set.

Figure 9:
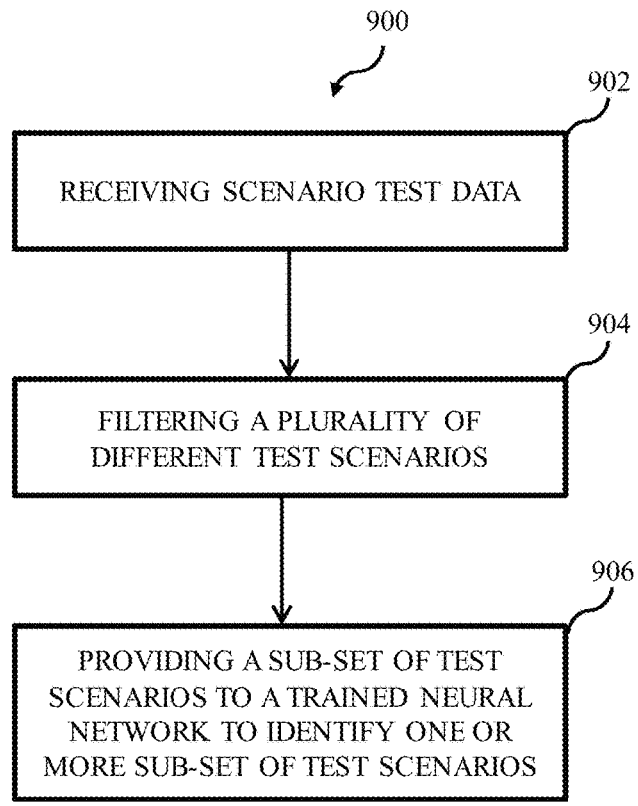
FIG. 9 depicts an example of a flow diagram illustrating an exemplary method for identifying an anomaly scenario from a plurality of scenarios that is likely to lead to an undesirable outcome resulting from an emergency causing event.

In view of the foregoing structural and functional features described above, a method that may be implemented will be better appreciated with reference to FIG. 9. While, for purposes of simplicity of explanation, the method of FIG. 9 is shown and described as executing serially, it is to be understood and appreciated that such method is not limited by the illustrated order, as some aspects could, in other embodiments, occur in different orders and/or concurrently with other aspects from that shown and described herein. Moreover, not all illustrated features may be required to implement a method.

FIG. 9 depicts an example of a flow diagram illustrating an exemplary method 900 for identifying a scenario of a plurality of scenarios that is likely to lead to an undesirable outcome. In some examples, the method 900 may be executed by a tool (e.g., the tool 102, as illustrated in FIG. 1). The method may begin at 902 by receiving scenario test data representative of a plurality of different test scenarios for a system. Each test scenario may be characterized by a set of observable parameters for the system. At 904, the method may include filtering the plurality of different test scenarios to identify a sub-set of test scenarios from the plurality of different test scenarios having similar behavior characteristics. At 906, the method may include providing the sub-set of test scenarios to a trained neural network to identify one or more sub-set test scenarios. The one or more identified sub-set of test scenarios may correspond to one or more anomaly test scenarios from the sub-set of test scenarios that is most likely to lead to an undesirable outcome associated with an emergency causing event.

It should be noted that the filtering of the plurality of different test scenarios to identify a sub-set of test scenarios from the plurality of different test scenarios having similar behavior characteristics to search for the one or more anomaly test scenarios from the sub-set of test scenarios that is most likely to lead to an undesirable outcome associated with an emergency causing event may require deep learning of neural networks processing massive amount of annotated data which is expensive and time consuming. Several methods including domain adaptation, differential geometry and modular networks may be utilized to simplify such time consuming tasks.

FIG. 10 illustrates an overview of different techniques in topology modularization utilized in neural network data processing.

A new type of architecture called "Aggregate Network" is proposed to solve a complicated task that has many learnable parameters. The Aggregate network is very similar to typical convolutional neural networks but deviates from common networks in its core 'agents'. In fact, the Aggregate network consists of several 'bulks', which are composed of multiple 'blocks'. Each block in a bulk can be considered as an agent that is specialized to perform a certain task. These tasks are often more complicated than tasks that a filter can learn. This agent-based network easily learns complicated task and breaks them down into simpler tasks.

Modularization of neural network may be broken down into the following parts: (a) Domain: Extracting certain information from the input data, e.g., applying image processing technique to extract a specific part of an object; (b) Topology: The recipe to connect different modules and parts of a network to each other; (c) Formation: Primarily concerned with the method used for connecting and constructing modules; (d) Integration: The final step to fuse different modules into a cohesive system.

The overall topology of a network is defined by how different nodes and modules are connected. Throughout the research on neural networks, neuroscience has been the source of inspiration for topological modularity. A subtle yet important note on modularization is the difference between topological modularity and functional modularity. Topological modularity is a necessary but not sufficient condition of functional modularity, i.e., functional specialization is only possible with having a learning algorithm present along with topological modularity.

The overall topology of a network is defined by how different nodes and modules are connected (see FIGS. 11A-B, 12A-D). For instance, highly-clustered non-regular (HCNR) is a modular topology which has dense connections within its modules. A multi-architectural topology may include several different network architectures wired in certain ways to create a more complex network architecture. A repeated block topology consists of smaller blocks that compose the entire architecture by a certain repetition rule. The repeated block topology can be multi-path (multiple subnetworks, which are semi-independently connected), sequential (based on construction by composition, i.e., a series of similar blocks connected to one another compose the architecture), recursive, or modular node (similar to regular monolithic neural networks except that some single neurons are replaced with a module) as shown in FIG. 10 above.

The following describes the topological modularity techniques in more details:

Highly-clustered non-regular (HCNR) (see FIG. 11A): is a modular topology which has dense connections within its modules. Connections within a module are also nonregular, i.e., a repeating template can describe the topology. Although dense within modules, connections between different modules are sparse. HCNR share some properties with a viable network in neuroscience, small-world networks, where nodes are not one another's neighbors in general, but the neighbors of a given node are most likely neighbors. Properties such as short average path between two nodes and sparse connectivity reduces the computation complexity of HCNR and equipped them with short-term memory.

Multi-Architectural (see FIG. 11B): A multi-architectural topology may include several different network architectures wired in certain ways to create a more complex network architecture. Multi-architectural topology is often complex and time consuming to train. However, the ensemble of various architecture improves the performance and increases the error tolerance.

Repeated block (see FIGS. 12A-D): As it is also understood from the title, a repeated block topology consists of smaller blocks that compose the entire architecture by a certain repetition rule. Smaller blocks could be entirely identical or similar to some degree. There is a large body of scientific work that connects the repeated block notion to biology. One can also more intuitively decipher repeated blocks due to their structural characteristics. The most common repeated block topologies are categorized by how they are used in a network:

Multi-path (see FIG. 12A): multi-path are multiple sub-networks, which are semi-independently connected (FIG. 5.5a). Each path receives and processes the input in parallel with other paths. Perhaps one of the most cited problems in computer vision is how the visual system of an animal can be translated into a network. It is believed that each type of retinal ganglion cells independently tiles the entire visual canvas. Each cell perceives a visual context through its different aperture and sensitivity to features of that stimulus. Thus, multi-path topology is in accord with biology.

Parallelism in multi-path topology provides two unique characteristics that regular deep neural networks do not possess. One, extending multiple paths both in the direction of depth and width is easier that regular deep neural networks, in which later layers are dependent on the earlier layers. Second, various modes and type of input data can be fed into multi-path networks. The renowned Siamese network is often used for finding similarity between objects over time, fusing different sources of data such as depth and RGB image in semantic segmentation, etc. Multi-path topology can be integrated into other topologies as well. For instance, ResNetXt is the improved version of ResNet, which is a sequential topology. ResNetXt modules have multi-path structure. In summary, multi-path topology provides parallelism and multi-model fusion at the cost of additional hyper-parameters.

Modular Node (see FIG. 12B): Modular node is very similar to regular monolithic neural networks except that some single neurons are replaced with a module. Modular nodes increase the computational capacity of a neural network but requires a careful design for each module. Block-Based Neural Network (BBNN) is an example of such topology that was originally designed for hardware configuration but later was used in others tasks, as well. Long Short-Term Memory (LSTM), which is a popular recurrent neural networks (RNN), also has a modular node. Yet another well-known network architecture that benefits from modular node structure is CapsNet [110] that attempts to overcome the limitation of CNNs by using vectors of instantiation parameters instead of nodes to represent objects. Nevertheless, such representation is pose invariant, while the use of regular CNNs only provides translation invariance.

Recursive topology (see FIG. 12C): Recursive topology is mainly designed to study and process temporal input data. Building blocks are often being repeated through a nested loop. FractalNet is an example of such topology. The claim of FractalNet is that residual representation is not the reason that very deep neural networks outperform their competition but it is the path length and therefore how gradient is effectively propagated. Sequential topology is based on construction by composition, i.e., a series of similar blocks connected to one another compose the architecture.

Sequential topology (see FIG. 12D): Sequential topology has a similar notion to deep networks in which concepts that are more complex are dependent on lower level concepts but instead of units, modules appear in the sequential topology. Inception and Xception are among the more famous networks with sequential topology. LSTM can also be considered as a temporal sequential topology. Perhaps the main downside of networks with sequential topology is the training part, which could be difficult. However, many deep network architectures share this disadvantage. Empirical tricks for training deep networks such as batch normalization could potentially be used for networks with sequential topology as well.

Another embodiment of modular neural network architecture called Aggregate network (see FIG. 13) is disclosed as an alternate embodiment of the neural network for real-time data processing to detect anomaly scenarios.

Figure 13:
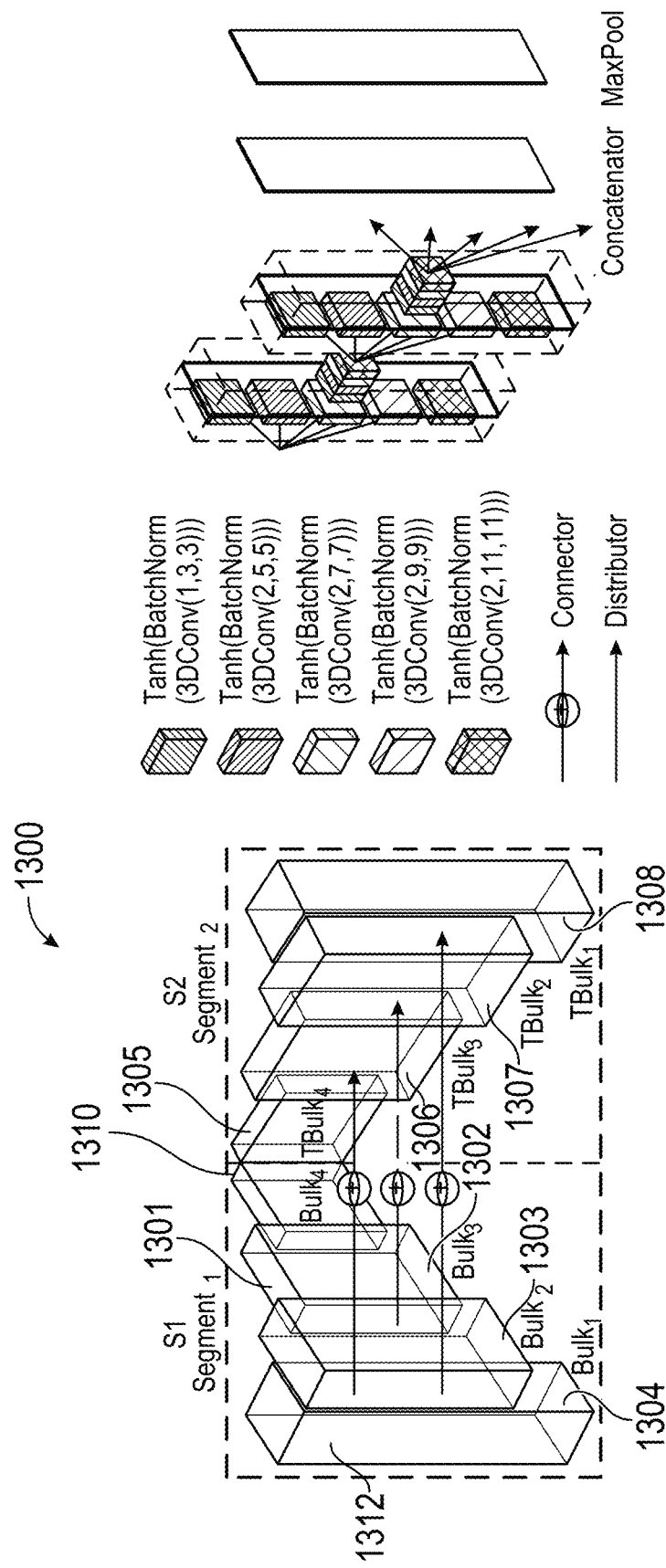
FIG. 13 illustrates an exemplary aggregated network as an alternate embodiment of the neural network for real-time data processing to detect anomaly scenarios.

An overview of Aggregate architecture is shown in FIG. 13. The architecture may be modular with shallow depth towards to a front of the architecture. A block depth increases as the data flows to the back of the architecture. In an embodiment, the Aggregate network may be built of specialized agents (i.e., blocks) for processing micro tasks. A bulk of blocks is a unit that hosts specialized blocks, thus becoming a unit of agents specialized for processing certain macro tasks. The key operators in each block may be convolution kernels, activation functions, and batch normalization layers. Certain blocks may also include other operations such as transposed convolution kernels. An Aggregate network may be warm started with another backbone architecture, as well.

Blocks may include a 3DConv with variable number of strides, filters, and kernel size depending on where in the architecture they appear. To make blocks level-set friendly, Tan h may be chosen as the activation function to produce a range of values between −1 and 1 for the normalized distance field. Prior to passing feature maps from the convolution kernel to the activation function, they are passed to a batch normalization layer. The input data, which is a set of sequential RGB images—for instance, 8 consecutive frames—may be fed to a block with 64 filters, a kernel size of (t:3; w:3; h:3), and a stride of size (t:1;w:1;h:1).

The architecture has 4 bulks (1302 to 1304) in the first segment S1 and another 4 bulks (1305-1308) in the second segment S2. The first segment S1 may be responsible for learning special tasks, which will be used in the second segment S2 to reconstruct a volumetric input. The first bulk (1301) in the first segment has 16 blocks, each block has 4 filters, stride of size (t:1;w:1;h:1). The kernel size varies from one block to another in order to capture entities with various scale and size. Such design ensures scale invariance in addition to addressing the dilemma of choosing the appropriate kernel size. A kernel size can take on any of the following sizes: [t, w, h]→[1, 3, 3], [2, 5, 5], [2, 7, 7], [2, 9, 9], [2, 11, 11].

A circular assignment scheme may be used to choose a kernel size. Thus, the 1st; 6th; 11th, and 16th blocks may have the same size kernels. Similarly, the 2nd; 7th and 12th blocks may share the same design. Following this pattern, the first bulk has 4 different style blocks ranging from smaller to large receptive field. At the end, all the filters for a bulk may be concatenated, e.g., the shape of feature maps coming out the first bulk is (T, W, H, 64). It should be noted that there are no inner connections in a bulk, and every block in a bulk shares the same input.

When the data flow leaves the first bulk (1301), a maxpool layer with kernel size [2, 2, 2] and stride of size [2, 2, 2] is applied. The second bulk (1302) has a similar set of blocks but with different number of filters. In the second bulk (1302), blocks will have 16 filters each. The number of blocks may be set to 8, which results to 128 different filters coming out of the second bulk (1302). The kernel size follows the same circular assignment scheme in the previous bulk (1302). Then, the output of this bulk has the following shape: [T=2, H=2, W=2, 128].

In the second segment S2, bulks and blocks are slightly different, which may be called transpose bulk and transpose block. The first transpose bulk (1305) has 1 block and 1 transpose block. The block has 512 filters, stride [1, 1, 1], and kernel size of [2, 3, 3]. The output of block is the input of transpose block with 512 filter, kernel size of [2, 2, 2], and stride [1, 1, 1]. Similarly, the second transpose bulk (1306) includes a block and a transpose block, as well. The block has 256 filters, stride [1, 1, 1], and kernel size of [2, 3, 3]. The transpose block has 256 filter, kernel size of [2, 2, 2], and stride [2, 2, 2].

Bulks (1301-1304) in the first segment S1 are connected to their corresponding bulks (1305-1308) in the second segment S2. Skip connections transfer features extracted in the early stage to bulks deeper in the network. Such wiring attenuates flaws in the reconstruction compared to the case when no feature from earlier stages is passed along. At the last layer, the output of the last bulk (1304 or 1308) is fed to a 3DConv with Tan h activation and 1 filter with [1, 1, 1] kernel size. This will provide distance values for the objects in a sequence of images.

Figure 14:
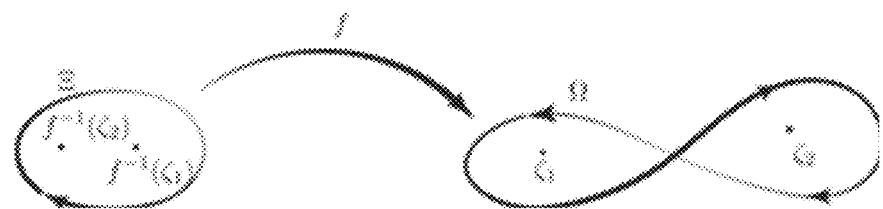
FIG. 14 illustrates an exemplary spatial mapping function to associate a cost function to a specific feature from collected real-time data for training an aggregate neural network.

In an aspect of deep learning, cost functions play a vital role. In the literature, cost functions have been studied from a statistical point of view, in great detail. The nature of cost functions from a geometric point of view is considered. Cost functions may induce certain geometries on the domain of data. For instance, a Kullback-Leibler (KL) divergence function may induce a flat structure on a manifold of data. This flatness, however, is never satisfied in the neural networks. Thus, a regularizer term may be added to ensure that both implicit and explicit assumptions are made during a design of cost functions won't be violated. For instance, for the KL divergence, one may use the Brouwer degree as a regularizer, which counts a number of twists and orientation of a manifold of data under a mapping function f (see FIG. 14).

In another aspect of deep learning, Geometric cost functions may be implemented in the Aggregate network. Each block in the network may learn a specific micro task that is best described by a certain primitive geometry. This micro task is different from another micro task learned by a different block in the same bulk. The composition of these modular tasks and primitive geometries may create more complex tasks. For instance, the manifold of all human faces may share a specific geometry in general (the shape of a face, the location of eyes, lips, nose, etc.). However, the manifold of male faces is different from the manifold of female faces. Both manifolds are different from the manifold of baby faces. Once the manifolds of male and female faces are learned by the Aggregate network, one may generate baby faces from the aforementioned manifolds. The geometric cost function ensures that the spatial relationship between facial features is kept.

Figure 15:
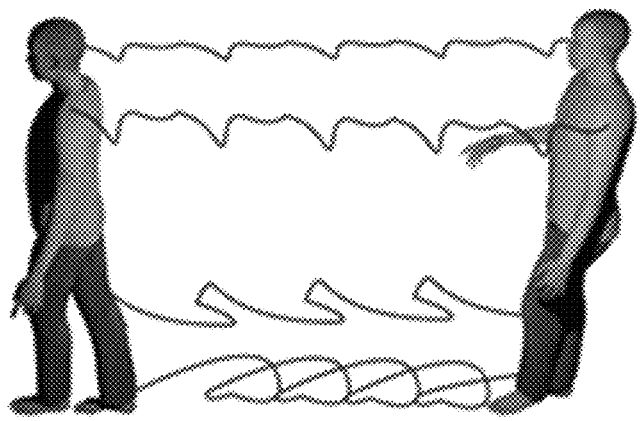
FIG. 15 illustrates an exemplary application of implementing a cost function in the aggregate neural network to learn differentiating different walking patterns.

As mentioned, Aggregate network may be implemented in anomaly scenarios detection. For instance, when a group of people are walking toward a stadium, while a smaller group is walking out of the stadium, it may be desirable to detect which group dominates the flow and the direction of the crowd. The walking pattern of a human in various scenarios may be learned by the Aggregate network. For example, the trajectory of the person may calculated and predicted over time. In such case, the Aggregate network is equipped with three dimensional operators. Thus, the learned trajectory is temporally consistent, i.e., both time and space information may simultaneously be used during learning and prediction. A geometric formulation of a cost function that performs classification on the manifold of all the walking patterns and trajectories may easily differentiate a direction of individuals as shown in FIG. 15.

What have been described above are examples. It is, of course, not possible to describe every conceivable combination of elements, components, or methods, but one of ordinary skill in the art will recognize that many further combinations and permutations are possible. Accordingly, the disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A computer-implemented method comprising:
    receiving scenario test data representative of a plurality of different scenarios for a system, wherein each scenario is characterized by a set of observable parameters for the system;
    filtering the plurality of different test scenarios to identify a sub-set of scenarios from the plurality of different scenarios having similar behavior characteristics;
    providing the sub-set of scenarios to a trained neural network to identify one or more sub-set of scenarios, wherein:
        the trained neural network is one of: a convolutional neural network and a modular neural network,
        the modular neural network utilizes a modular topology formed by smaller network nodes each utilizing different techniques to perform filtering the plurality of different test scenarios to identify a sub-set of scenarios from the plurality of different scenarios having similar behavior characteristics, the techniques used in the modular topology comprises two or more of: highly-clustered non-regular (HCNR) topology, repeated blocks topology, multi-architectural topology, the repeated blocks topology further comprises a multi-path node, a modular node, a sequential node and a recursive node, the one or more identified sub-set of scenarios correspond to one or more anomaly scenarios from the sub-set of scenarios that is most likely to lead to an undesirable outcome associated with an emergency causing event; and taking corrective actions to mitigate or to prevent occurrence of the undesirable outcome according to the identified one or more sub-set scenarios.

2. The computer-implemented method of claim 1, further comprising training a neural network based on scenario training data comprising a plurality of different training scenarios for the system.

3. The computer-implemented method of claim 1, wherein the user input comprises a number of convolution layers, a number of pooling layers, an output layer, an input layer, and a number of fully connected layers.

4. The computer-implemented method of claim 3, wherein the convolutional neural network comprises six convolutional layers, three max pooling layers, and three fully connected layers.

5. The computer-implemented method of claim 1, further comprising:

training the neural network based on scenario training data comprising a plurality of training scenarios, the trained neural network corresponding to a trained neural network; and wherein the providing comprises providing the sub-set of scenarios to the neural network for classification of the sub-set of scenarios.

6. The computer-implemented method of claim 5, wherein the classification comprises one of classifying the one or more sub-set of scenarios as one of having (i) a total effective dose equivalent (TEDE) less than or equal to 10 rem, and (ii) a TEDE greater than 10 rem.

7. The computer-implemented method of claim 6, wherein the one or more sub-set of scenarios classified as having the TEDE greater than 10 rem correspond to the one or more scenarios that is most likely to lead to the undesirable outcome.

8. The computer-implemented method of claim 7, further comprising:

generating display data characterizing the one or more sub-set of scenarios classified as having the TEDE greater than 10 rem; and displaying the display data on a display to provide a human a visualization of the one or more sub-set of scenarios classified as having the TEDE greater than 10 rem.

9. The computer-implemented method of claim 7, further comprising generating a real-time emergency plan based on the one or more sub-set of scenarios classified as having the TEDE greater than 10 rem.

10. The computer-implemented method of claim 1, wherein the undesirable outcome is a release of ionizing radiation.

11. The computer-implement method of claim 10, wherein the emergency causing event is a radiological causing event.

12. The computer-implemented method of claim 1, wherein the system is a given system at a nuclear facility.

13. The computer-implemented method of claim 1, wherein the filtering comprises applying a clustering processing to the plurality of different scenarios to identify the sub-set of scenarios from the plurality of the different scenarios.

14. The computer-implemented method of claim 13, wherein the applying comprises applying a mean shift methodology (MSM) to the plurality of different scenarios to identify a cluster of scenarios, wherein one or more cluster of scenarios corresponds to the sub-set of scenarios from the plurality of the different scenarios.

15. The computer-implemented method of claim 14, wherein the sub-set of scenarios is assigned to a given bin of a plurality of bins, wherein the plurality of bins comprises a first bin corresponding to a total effective does equivalent (TEDE) that is greater than 10 rem and a second bin corresponding to a TEDE less than or equal to 10 rem.

16. The computer-implemented method of claim 1, wherein the scenario test data is provided by an Analysis of Dynamic Accident Progression Trees (ADAPT) system.

17. The computer-implemented method of claim 1, wherein each test scenario is represented by a matrix, n×m, wherein n is a number of the set of observable parameters and m is a given number of time divisions over a plurality of simulations of a system model for the system.

18. The computer-implemented method of claim 1, wherein the modular neural network comprises an aggregate network formed by a plurality of specialized blocks for processing micro tasks, wherein the aggregate network having an architecture of a shallow block depth at a front portion, and increases depth in the block as a flow of the scenario test data increases towards a back portion, wherein each block having a different kernel size at a same level for capturing features with different data sizes in the scenario test data.

19. The computer-implemented method of claim 18, wherein the kernels are selected from one of: a convolution kernel, a transpose convolution kernel.

20. The computer-implemented method of claim 18, wherein processing channels increases in each block.

21. A computer-implemented method comprising:

receiving scenario test data representative of a plurality of different scenarios for a system, wherein each scenario is characterized by a set of observable parameters for the system;

filtering the plurality of different test scenarios to identify a sub-set of scenarios from the plurality of different scenarios having similar behavior characteristics;

providing the sub-set of scenarios to a trained neural network to identify one or more sub-set of scenarios, wherein the trained neural network is one of: a convolutional neural network and a modular neural network and the one or more identified sub-set of scenarios correspond to one or more anomaly scenarios from the sub-set of scenarios that is most likely to lead to an undesirable outcome associated with an emergency causing event;

training the neural network based on scenario training data comprising a plurality of training scenarios, the trained neural network corresponding to a trained neural network, wherein the providing comprises providing the sub-set of scenarios to the neural network for classification of the sub-set of scenarios, and the classification comprises one of classifying the one or more sub-set of scenarios as one of having (i) a total effective dose equivalent (TEDE) less than or equal to 10 rem, and (ii) a TEDE greater than 10 rem; and taking corrective actions to mitigate or to prevent occurrence of the undesirable outcome according to the identified one or more sub-set scenarios.

22. A computer-implemented method comprising:

receiving scenario test data representative of a plurality of different scenarios for a system, wherein each scenario is characterized by a set of observable parameters for the system;

filtering the plurality of different test scenarios to identify a sub-set of scenarios from the plurality of different scenarios having similar behavior characteristics, wherein each test scenario is represented by a matrix, n×m, wherein n is a number of the set of observable parameters and m is a given number of time divisions over a plurality of simulations of a system model for the system;

providing the sub-set of scenarios to a trained neural network to identify one or more sub-set of scenarios, wherein the one or more identified sub-set of scenarios correspond to one or more anomaly scenarios from the sub-set of scenarios that is most likely to lead to an undesirable outcome associated with an emergency causing event; and taking corrective actions to mitigate or to prevent occurrence of the undesirable outcome according to the identified one or more sub-set scenarios.

* * * * *